May 6, 1952 S. L. HJERTSTRAND 2,596,025

SIGNALING OVER TELEPHONE LINES BY MEANS OF A NONLINEAR RESISTANCE

Filed July 7, 1949 2 SHEETS—SHEET 1

Inventor
S. L. Hjertstrand
By Glascock Downing & Seebold
Attys

May 6, 1952 S. L. HJERTSTRAND 2,596,025

SIGNALING OVER TELEPHONE LINES BY MEANS OF A NONLINEAR RESISTANCE

Filed July 7, 1949 2 SHEETS—SHEET 2

Inventor
S. L. Hjertstrand
By Glascock Downing & Seebold
Attys.

Patented May 6, 1952 2,596,025

UNITED STATES PATENT OFFICE 2,596,025

SIGNALING OVER TELEPHONE LINES BY MEANS OF A NONLINEAR RESISTANCE

Svante Lennart Hjertstrand, Stockholm, Sweden, assignor to Telefonaktiebolaget L M Ericsson, Stockholm, Sweden, a company of Sweden Application July 7, 1949, Serial No. 103,490
In Sweden January 3, 1948

7 Claims. (Cl. 179—16)

The present invention relates to transmission of signals on telephone lines through connection of resistances by means of push buttons in a circuit over the line, whereby the circuit on the receiver side contains a source of current and a receiving device which transmits the signals to a recording device, i. e. an automatic register pertaining to a telephone exchange.

The object of the invention is to provide a swift and reliable signal transmission by the aid of simple and cheap sending and receiving devices.

A feature of the invention is an arrangement where at least one of said resistances is dependent on the direction of the current and the receiving device contains two sets of relays of which one during a signal is set in dependence of the resistance in the circuit at a certain direction of current in the line and the other is set in dependence of the resistance in the circuit at the opposite direction of current. The first mentioned set of relays is causing a reversal of the direction of current in the line and the signal is registered in dependence of all relays in said two sets of relays, which have been actuated during the signal.

Another feature of the invention is that at least one of said resistances is non-linear, i. e. consists of a discharge tube or of a silicon carbide resistance and thereby that the receiving device first is set in dependence of the resistance in the circuit over the line under influence of a certain direct current source, which hereafter by means of a switching device is replaced by a direct current source with another voltage, whereafter the receiving device is set in dependence of the resistance in the circuit under influence of last-mentioned direct current source, the signal thereafter being fixed in dependence of both mentioned settings in the receiving device.

The invention will be described more closely with reference to the enclosed drawings.

Figure 1:
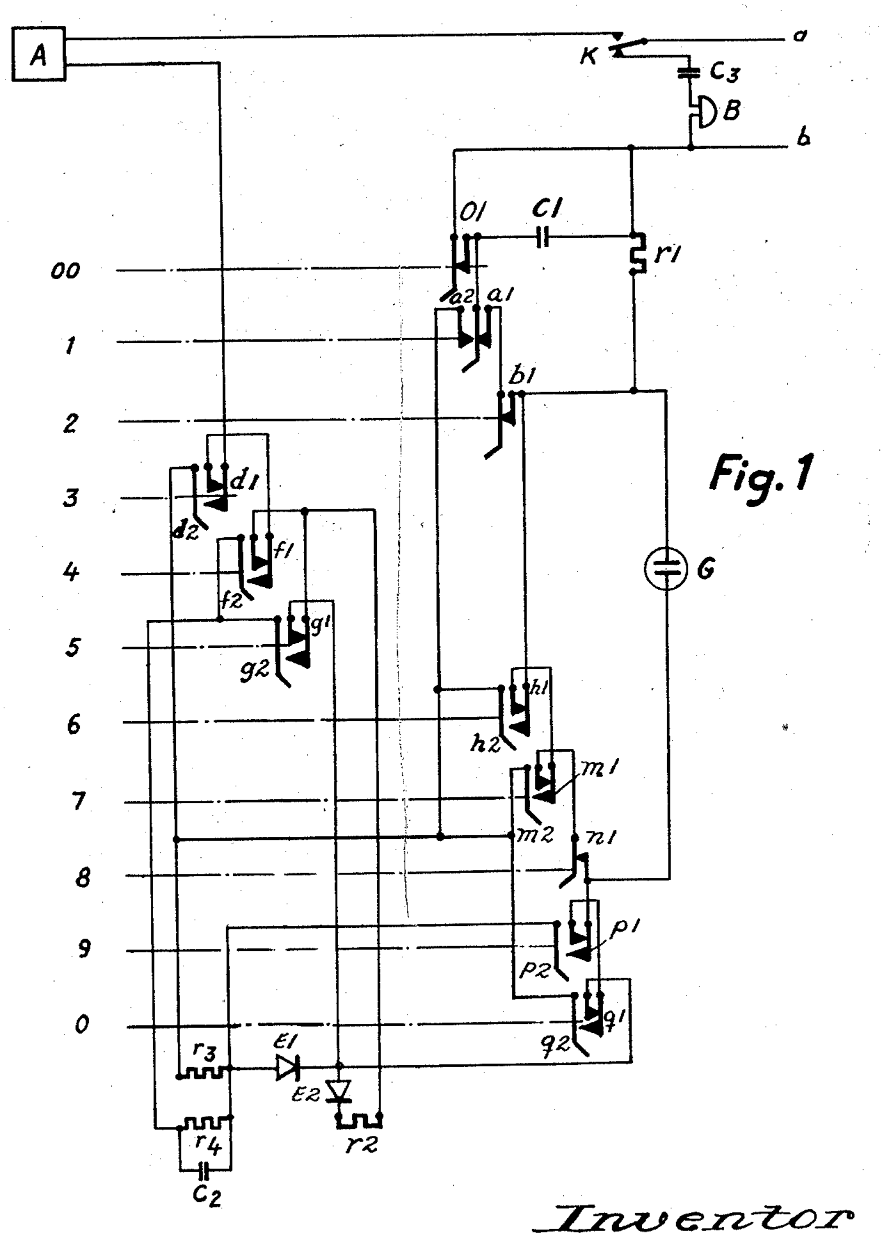
Fig. 1 shows push buttons 00, 1—0 and resistances for sending of signals from a subscriber's apparatus.
Figure 2:
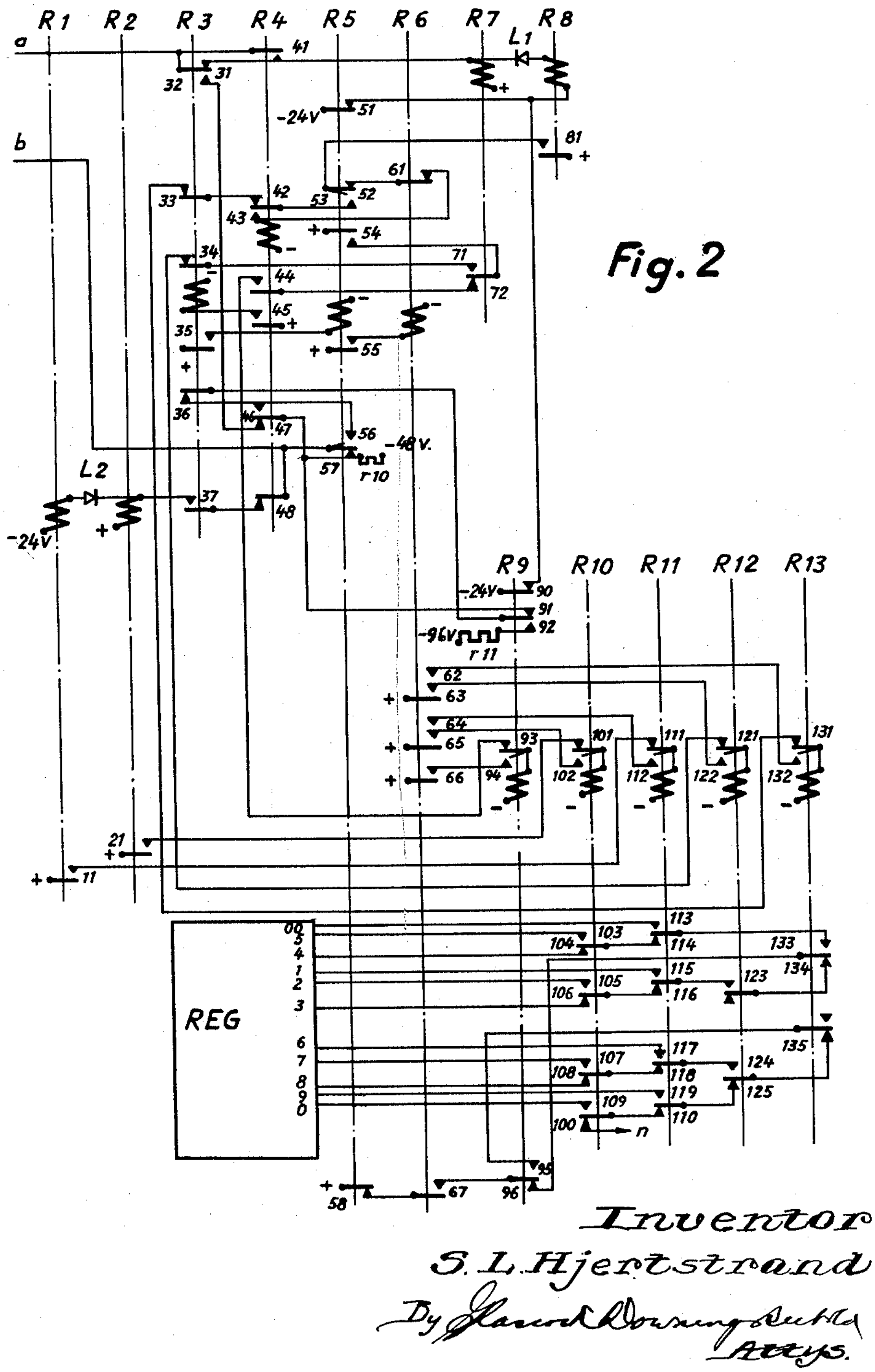
Fig. 2 shows the receiving device on that telephone exchange, to which the subscriber's apparatus in Fig. 1 is connected.

In Fig. 1 A is a subscriber's apparatus, which is connected to a telephone line *a*—*b*. When the hand microtelephone of the subscriber's apparatus rests in the cradle, the bell B over a condenser C3 is connected to the line. Upon calls from the apparatus the contact K changes the *a*-wire and a circuit is closed from —48 v. over the resistance r10 in Fig. 2, contact 57, *b*-wire, contacts 01, a1, b1, h1, m1, n1, p1, q1, g1, f1, d1, apparatus A, the cradle-contact K, *a*-wire, contact 31, through the winding on relay R7 to + resp. over the rectifier L1, the winding on relay R8 and contact 51 to —24 v. The voltages —24 and —48 v. and —96 v., which are to be found in Fig. 2, are terminals on an electric battery, the + pole of which is indicated with + in the figure. The resistances in the windings of the relays R7 and R8 and the resistance r10 are chosen in relation to the resistance of the subscriber's line and the subscriber's apparatus in such a way that the relay R8 as well as relay R7 attracts its armature in the indicated circuit. Contacts 71, 72 and 81 are actuated. The following circuit is completed: +, contacts 81, 52 and 61, winding on relay R4 to negative. Relay R4 attracts its armature. Contacts 41—48 are actuated. Relay R3 receives current over contact 45 and attracts its armature. Contacts 31—37 are actuated. Relay R5 receives current over contact 35 and attracts its armature. Contacts 51—58 are actuated. Relay R4 is self held over contacts 43, 53 and 81. Relay R6 receives current over contact 55 and attracts its armature. Contacts 61—67 are actuated. The above described circuit over the subscriber's line has now been switched according to the following: —48 v., resistance r10, contacts 46 and 56, *b*-wire, push buttons 00, 1—0, subscriber's apparatus A, the contact K, *a*-wire, contact 41, partly through the line on relay R7 to +, partly over the rectifier L1, winding on relay R8, contact 90 to —24 v.

The sending of signals from the buttons 00, 1—0 in Fig. 1 can then commence. When one of the buttons is actuated one of the resistances r1—r4 is connected or there will arise an interruption in the line loop because of the rectifier E1 or the discharge tube G. The resistances r1—r4 are all of the same size and cause that the relay R8 grows currentless and releases its armature. Contact 81 breaks and relay R4 releases its armature. At interruption in the line loop relay R7 releases its armature and the following circuit is completed: +, contacts 54, 72, 44 and 93, winding on relay R9 to negative. Relay R9 attracts its armature. Contacts 90—96 are actuated. When relay R4 releases its armature the current for relay R9 is closed, if there is not already an interruption in the line loop and R7 releases its armature. Hereby relay R9 has not been attracted.

When relay R4 has released its armature and contacts 47 and 48 close, the relays R1 and R2 are connected to the subscriber's line $a$—$b$ in the following circuit, which is independent of relay R9: —48 v., resistance $r$10, contacts 47 and 32, subscriber's line $a$—$b$, contacts 48 and 47, partly through the winding on relay R2 to +, partly through the rectifier L2, winding on relay R1 to —24 v. If the subscriber's line closed over a condenser C1 or C2 through one of the push buttons 00, 1—0 or the rectifier E1 connected in the direction of the current, both relays R1 and R2 will be actuated. Contacts 11 and 21 are hereby closed and relays R10 and R11 attract in circuits over the contacts 101 and 111, respectively. The relays R9—R13 are used for recording of a signal just going on and all of them are self-held in dependence of relay R6 in series with one of the contacts 6?—66.

If the subscriber's line for that direction of current, which prevails after release of relay R4 and during the release time of the relay R3, is closed over one of the resistances $r$1—$r$4, alone or in series with a rectifier connected in the direction of current, the relay R1 receives no current and only relay R2 and therewith R10 is energized. If there is an interruption in said direction of current none of the relays R1 and R11 or R2 and R10 is energized.

After relay R3 has released its armature a third control of the resistance in the coil of the subscriber's line is performed if the signal has been started with an interruption and thus relay R9 has been operated according to the description above. Thus occurs during the release time of relay R5 through the following circuit: —96 v., resistance $r$11, contacts 92, 36 and 56, the loop over the line $a$—$b$, contact 31, partly through the winding on relay R7 to +, partly through the rectifier L1, winding on relay R8, contact 51 to —24 v. The resistance in the line loop is now controlled with the original direction of current but with a voltage of 96 volts instead of 48 volts.

If the interruption in the loop at the beginning of the signal has been caused by the rectifier E1, the loop is still broken and none of the relays R7 and R8 is actuated. If on the contrary the interruption has been caused by the discharge tube G, the latter will glow when 96 volts are connected to the line and relay R7 attracts its armature. The following circuit is completed: +, contacts 54, 71, 34 and 121, winding on relay R12, to negative. Relay R12 attracts its armature. Contacts 121—126 are actuated. If however the interruption has been caused by the condenser C1, the recharging current to this condenser will cause actuation of both relay R7 and relay R8. Hereby a further circuit is completed: +, contacts 81, 53, 42, 33 and 131, winding on relay R13, to negative. Relay R13 attracts its armature. Contacts 131—135 are actuated.

When according to the above relay R10 attracts its armature the contacts 101—109 are actuated and, when relay R11 attracts its armature, the contacts 110—119 are actuated.

As appears from the description it is possible by a suitable choice of resistances, rectifiers, condensers and a discharge tube G to actuate the relays R9—R13 in different combinations by means of the push buttons 00, 1—0 in Fig. 1. The number of such combinations can be varied within certain limits and Fig. 2 shows 12 different combinations corresponding to each of the push buttons 00, 1—0 and to a complete interruption in the line loop through the cradle-contact K.

Instead of the discharge tube G a silicon carbide resistance can be introduced. These resistances dependent in value upon the applied voltage and decrease their resistance when the applied voltage is increased. A silicon carbide resistance will at two different voltages, i. e. 48 and 96 volts, show an alteration of the resistance similar to that of a discharge tube.

If for instance the push button 6 in Fig. 1 is pushed down the following procedure takes place.

(1) The rectifier E1, connected in parallel with the discharge tube G, is connected and caused an interruption in the line loop. The relays R7 and R8 release their armatures. Relay R9 attracts its armature.

(2) After reversing of the current the loop is closed over the rectifier E1. Relays R1 and R2 and R10 and R11 attract their armatures.

(3) After the direction of current has been again reversed and —96 v. has been connected to the line, the discharge tube G glows and relay R7 and relay R12 attract their armatures.

(4) When relay R5 has released its armature, the following circuit is closed during the release time for the relay R6: +, contacts 58, 67, 95, 135, 124 and 117 to the wire 6 leading to a registering device REG, where the signal 6 is registered.

(5) When relay 6 releases its armature, relays R9—R13 release.

(6) When the push button 6 in Fig. 1 is released, the relays R7—R8 and R3—R6 are actuated as is described above. The discharge tube G is short-circuited and expires.

If it is supposed that the subscriber puts on the hand microtelephone, the following procedure takes place:

(1) The line loop is broken in the cradle-contact K. The relays R7 and R8 release their armatures. Relay R9 attracts its armature.

(2) At reversing of the current there is still an interruption and neither R1 nor R2 is actuated.

(3) When the direction of current is again reversed and —96 v. connected to the line, there is still an interruption if none of the relays R7 and R8 attracts its armature.

(4) During the release time for the relay R6 the following circuit is completed: +, contacts 58, 67, 95, 135, 125, 110 and 100 to the wire $n$, which is supposed to lead to a device which disconnects the connection.

I claim:

1. In a signalling system for automatic telephony, a bank of keys including a number of keys each having a break contact, a receiving device to which the subscriber's apparatus is connected in the exchange, a two wire line connecting said bank of keys with said receiving device, a main circuit including a source of direct current, said receiving device, said two wire line and all of said break contacts being connected in series, a plurality of shunt circuits each extending from one side of the line to various points intermediate the break contacts, a number of resistances in said shunt circuits including at least one resistance dependent in value upon the polarity of the voltage impressed across same, each of said keys when operated connecting at least one of said resistances into the main circuit, a first relay in said receiving device and connected in the main circuit to be energized by the operation of any one of said keys, said first relay being energized during the initial direction of current flow by the current as determined by the resistance in the main circuit, means operated by said first relay for causing a reversal in the direction of current flow, a second relay in said receiving device, said second relay being energized during the reverse direction of current flow by the current as determined by the resistance in the main circuit, means operated by said first relay for changing said line over from the first to the second relay, and a register, and a plurality of relays for operating said register responsive to the joint energization of said two relays.

2. In a signalling system for automatic telephony, a bank of keys including a number of keys each having a break contact, a receiving device to which the subscriber's apparatus is connected in the exchange, a two wire line connecting said bank of keys with said receiving device, a main circuit including a source of direct current, said receiving device, said two wire line and all of said break contacts being connected in series, a plurality of shunt circuits each extending from one side of the line to various points intermediate the break contacts, a number of resistances in said shunt circuits including at least one resistance dependent in value upon the polarity of the voltage impressed across same, each of said keys when operated connecting at least one of said resistances into the main circuit, a first relay in said receiving device and connected in the main circuit to be energized by the operation of one of said keys, said first relay being energized during the initial direction of current flow by the current as determined by the resistance in the main circuit, means operated by said first relay for causing a reversal in the direction of current flow, a second relay in said receiver, said second relay being energized during the reverse direction of current flow by the current as determined by the resistance in the main circuit, means operated by said first relay for changing said line over from the first to the second relay, a set of relays in said receiving device, means operated by said second relay for producing an increase in voltage from said direct current source and connecting said set of relays into the main circuit, said set of relays being energized according to the current in the line, and a register connected to said two relays and said set of relays and operated by their combined energization.

3. In a signalling system for automatic telephony, a bank of keys including a number of keys each having a break contact, a receiving device to which the subscriber's apparatus is connected in the exchange, a two wire line connecting said bank of keys with said receiving device, a main circuit including a source of direct current, said receiving device, said two wire line, and all of said break contacts connected in series, a plurality of shunt circuits each extending from one side of the line to various points intermediate the break contacts, a number of resistances in said shunt circuits including at least one resistance dependent in value upon the polarity of the voltage impressed across same, each of said keys when operated connecting at least one of said resistances into the main circuit, a first pair of relays in said receiver and connected in the main circuit to be energized by the operation of one of said keys, said first relays being energized during the initial direction of current flow by the current as determined by the resistance in the main circuit, responsive to the current intensity, means operated by said first relays for causing a reversal in direction of the current flow, a second pair of relays in said receiver, said second relays being energized during the reverse direction of current flow by the current as determined by the resistance in the main circuit, means operated by said first relays for changing said line over from the first to the second relays, means operated by said second relays for producing an increase in voltage from said direct current source, and a register, and a plurality of relays for operating said register by the joint energization of said pairs of relays.

4. In a signalling apparatus for automatic telephone systems, a bank of keys including individual keys each having a break contact, a set of relays, a two wire line connecting said bank of keys with said set of relays, a main circuit including a source of direct current, said set of relays, said two wire line, and all of said break contacts connected in series, a plurality of shunt circuits each extending from one side of the line to various points intermediate the break contacts, a number of resistances in said shunt circuit including at least one rectifier, each of said keys when operated connecting at least one of said resistances into the main circuit, a first and second relay in said set of relays each connected in the main circuit, a third relay in said set of relays, a change over relay controlled by said first relay for reversing the direction of current flow in the main circuit and disconnecting said first and second relays and connecting said third relay in the main circuit, said third relay being dependent for operation on the value of the resistance in the main circuit by the reversed direction of the current flow, a register, a series of relays for operating said register, and circuits including contacts of the second and third relays for energizing said series of relays.

5. In a signalling apparatus for automatic telephone systems, a bank of keys including individual keys each having a break contact, a set of relays, a two wire line connecting said bank of keys with said set of relays, a main circuit including a source of direct current, said set of relays, said two wire line, and all of said break contacts connected in series, a plurality of shunt circuits extending from one side of the line to various points intermediate the break contacts, a number of resistances in said shunt circuits including at least one rectifier, each of said keys when operated connecting at least one of said resistances into the main circuit, a first pair of relays including first and second relays connected in the main circuit, said first relay being released by the operation of any one of said keys and said second relay being released by a break in the main circuit, a second pair of relays, a change over relay operated by the first relay for reversing the direction of current flow in the main circuit and disconnecting said first pair of relays and connecting said second pair of relays in the main circuit, the relays of said second pair being dependent for operation on the value of the resistance in the main circuit by the reversed direction of current flow, a register, a series of relays for operating said register, and circuits including contacts of the second relay of the first pair and both of the relays of the second pair for energizing said series of relays.

6. In a signalling apparatus for automatic telephone systems, a bank of keys including individual keys each having a break contact, a set of relays, a two wire line connecting said bank of keys with said set of relays, a main circuit including a source of direct current, said set of relays, said two wire line, and all of said break contacts connected in series, a plurality of shunt circuits each extending from one side of the line to various points intermediate the break contacts, a number of resistances in said shunt circuits including at least one having a lower value of resistance when a high voltage is impressed across same than when a low voltage is impressed across same and at least one rectifier, each of said keys when operative connecting at least one of said resistances into the main circuit, a first and second relay in said set of relays each connected in the main circuit, a third relay in said set of relays, a change over relay controlled by said first relay, switching means operated by said change over relay after release of said second relay to increase the voltage from said direct current source, disconnect said third relay and connect said control relay in the main circuit, said control relay being dependent for operation on the value of the resistances in the main circuit by the increased voltage, a register, a series of relays for operating said register in different combinations, and a plurality of circuits including contacts of the first and second pairs of relays and the change over relay for energizing said series of relays.

7. In a signalling apparatus for automatic telephone systems, a bank of keys including individual keys each having a break contact, a set of relays, a two wire line connecting said bank of keys with said set of relays, a main circuit including a source of direct current, and all of said break contacts connected in series, a plurality of shunt circuits extending from one side of the line to various points intermediate the break contacts, a number of resistances in said shunt circuits including at least one having a lower value of resistance when a high voltage is impressed across same than when a low voltage is impressed across same and at least one rectifier, each of said keys when operated connecting at least one of said resistances into the main circuit, a first pair of relays connected in the main circuit, said first relay being released by the operation of any one of said keys and said second relay being released by a break in the main circuit, a second pair of relays, a change over relay operated by the first relay for reversing the direction of current flow in the main circuit and disconnecting said first pair of relays and connecting said second pair of relays in the main circuit, the relays of the second pair being dependent for operation on the value of the resistance in the main circuit by the reverse direction of current flow, switching means operated by said change over relay after the release of said second relay for increasing the voltage from the direct current source and disconnecting said second pair of relays and re-connecting said first pair of relays in the main circuit, said first pair of relays being dependent for operation on the value of the resistance in the main circuit due to the increased voltage, a register, a series of relays for operating said register in different combinations, and a plurality of circuits including contacts of said first and second pairs of relays and said switching means for energizing said series of relays.

SVANTE LENNART HJERTSTRAND.

REFERENCES CITED

The following references are of record in the file of this patent:

UNITED STATES PATENTS

| Number | Name | Date |
|---|---|---|
| 1,886,216 | Nilsson | Nov. 1, 1932 |
| 2,153,654 | Trecheinski | Apr. 11, 1939 |
| 2,307,818 | Beale | Jan. 12, 1943 |
| 2,308,637 | Babcock | Jan. 19, 1943 |
| 2,354,668 | Deakin | Aug. 1, 1944 |